(12) United States Patent
Hsieh

(10) Patent No.: US 10,582,498 B2
(45) Date of Patent: Mar. 3, 2020

(54) METHOD FOR WIRELESS BACKHAUL FREQUENCY BAND FLEXIBLE ALLOCATION

(71) Applicant: Chunghwa Telecom Co., Ltd., Yangmei, Taoyuan County (TW)

(72) Inventor: Bo-Han Hsieh, Yangmei (TW)

(73) Assignee: CHUNGHWA TELECOM CO., LTD., Yangmei, Taoyuan County (TW)

( * ) Notice: Subject to any disclaimer, the term of this patent is extended or adjusted under 35 U.S.C. 154(b) by 74 days.

(21) Appl. No.: 15/066,965

(22) Filed: Mar. 10, 2016

(65) Prior Publication Data

US 2017/0079034 A1    Mar. 16, 2017

(30) Foreign Application Priority Data

Sep. 15, 2015   (TW) .............................. 104130374 A

(51) Int. Cl.
*H04W 72/04* (2009.01)
*H04W 84/04* (2009.01)

(52) U.S. Cl.
CPC ..... *H04W 72/0453* (2013.01); *H04W 84/045* (2013.01)

(58) Field of Classification Search
CPC .................. H04W 72/0453; H04W 84/045
See application file for complete search history.

(56) References Cited

U.S. PATENT DOCUMENTS

| 2013/0044712 A1* | 2/2013 | Kim ...................... H04L 5/0053 370/329 |
| 2015/0109932 A1* | 4/2015 | Goldhamer ....... H04W 72/0453 370/236 |
| 2015/0289144 A1* | 10/2015 | Yi ......................... H04W 36/22 370/252 |
| 2016/0219547 A1* | 7/2016 | Seo .................... H04W 56/0045 |

* cited by examiner

*Primary Examiner* — Peter P Chau
(74) *Attorney, Agent, or Firm* — Muncy, Geissler, Olds & Lowe, P.C.

(57) ABSTRACT

The present invention provides a method for wireless backhaul frequency band flexible allocation. It is able to use the uplink band of FDD band as the wireless backhaul uplink and downlink band of small cells. When the status is having a plurality of FDD bands and a heterogeneous network with big cells and one or more small cells, the present invention is able to efficiently use uplink band of the FDD band as the wireless backhaul band of the one or more small cells.

3 Claims, 4 Drawing Sheets

METHOD FOR WIRELESS BACKHAUL FREQUENCY BAND FLEXIBLE ALLOCATION

CROSS-REFERENCE TO RELATED APPLICATION

This application claims priority of Application No. 104130374, filed in Taiwan, R.O.C. on Sep. 15, 2015, the entire contents of which are hereby incorporated by reference.

BACKGROUND OF THE INVENTION

1. Field of the Invention

The present invention provides a method for flexibly allocating wireless backhaul frequency band among different cells in a frequency-division duplexing (FDD) uplink band. More particularly, the present invention provides a method for wireless backhaul frequency band flexible allocation.

2. Brief Description of the Prior Art

In heterogeneous network of different size cells, it is important to construct backhaul of microcells. If wired backhaul is used, the construction of a huge number of microcells is very difficult. If wireless backhaul is used, the main issue is to select frequency band of the wireless backhaul. If a license-free band is selected, it very easily gets interference with other communication systems. Nowadays, many service providers have more than two FDD bands, wherein the FDD band has symmetric uplink and downlink bands. However, due to population of smart phone and tablet devices, downlink flow of wireless communication (such as LTE) is much larger than uplink flow, thus a significant part of the uplink band of FDD band is wasted.

SUMMARY OF THE INVENTION

Due to the aforementioned disadvantages of the prior art, the present invention provides a method for wireless backhaul frequency band flexible allocation, which flexibly uses the uplink band of FDD as the wireless backhaul band of different cells. It is able to provide a layer or many layers of backhaul of microcell and efficiently uses uplink band of FDD.

The present invention provides a method for wireless backhaul frequency band flexible allocation and comprises steps of:

setting a first FDD band for big cell and setting a second FDD band for small cell in a heterogeneous network with the big cell and the small cell;

the first FDD band of the big cell comprising a first FDD uplink band and a first FDD downlink band, the second FDD of the small cell comprising a second FDD uplink band and a second FDD downlink band;

the uplink band of the first FDD band comprising a Physical Uplink Control CHannel (PUCCH) and a Physical Uplink Shared CHannel (PUSCH) located in two sides of the band, flexibly allocating a wireless backhaul uplink band in the PUSCH of the first FDD band as the uplink wireless backhaul among the big cell and small cell (data flow from the small cell to the big cell), wherein the allocation of the wireless backhaul uplink band is to first allocate the PUSCH of the PUCCH near the higher frequency; and the uplink band of the second FDD band comprising a Physical Uplink Control CHannel (PUCCH) and a Physical Uplink Shared CHannel (PUSCH) located in two sides of the band, flexibly allocating a wireless backhaul downlink band in the PUSCH of the second FDD band as the downlink wireless backhaul among the big cell and small cell (data flows from the big cell to the small cell), wherein the allocation of the wireless backhaul downlink band is to first allocate the PUSCH of the PUCCH near the higher frequency.

The flexible wireless backhaul uplink band is smaller than the band of PUSCH of the first FDD uplink band. The flexible wireless backhaul downlink band is smaller than the band of PUSCH of the second FDD uplink band. The flexible wireless backhaul downlink band is larger than the wireless backhaul uplink band.

The present invention further provides another method for wireless backhaul frequency band flexible allocation comprising steps of:

setting a first FDD band in a big cell of a heterogeneous network for the big cell, setting a second FDD band for a first layer small cell, and setting a third FDD band for a second layer small cell;

the uplink band of the second FDD band comprising a Physical Uplink Control CHannel (PUCCH) and a Physical Uplink Shared CHannel (PUSCH) located in two sides of the band, flexibly allocating a second wireless backhaul downlink band and a second wireless backhaul uplink band in the PUSCH of the second FDD band, the allocated second wireless backhaul downlink band as the downlink wireless backhaul among the big cell and the second layer small cell (data flows from the big cell to the second small cell), the allocated second wireless backhaul uplink band as the uplink wireless backhaul among the big cell and the first layer small cell (data flow from the first small cell to the big cell), wherein the allocation of the second wireless backhaul downlink band and the second wireless backhaul uplink band is to first allocate the PUSCH of the PUCCH near the higher frequency and the particular sequence is first allocating the second wireless backhaul downlink band and then allocating the second wireless backhaul uplink band, and the rest is as the PUSCH of the first layer small cell; and the uplink band of the third FDD band comprising a Physical Uplink Control CHannel (PUCCH) and a Physical Uplink Shared CHannel (PUSCH) located in two sides of the band, flexibly allocating a third wireless backhaul downlink band and a third wireless backhaul uplink band in the PUSCH of the third FDD band, the allocated third wireless backhaul downlink band as the downlink wireless backhaul among the big cell and the first layer small cell (data flow from the big cell to the first small cell), the allocated third wireless backhaul uplink band as the uplink wireless backhaul among the big cell and the second layer small cell (data flow from the second small cell to the big cell), wherein the allocation of the third wireless backhaul downlink band and the third wireless backhaul uplink band is to first allocate the PUSCH of the PUCCH near the higher frequency and the particular sequence is first allocating the third wireless backhaul downlink band and then allocating the third wireless backhaul uplink band, and the rest is as the PUSCH of the second layer small cell.

The sum of the flexible wireless backhaul downlink band and the flexible wireless backhaul uplink band of the second FDD band is smaller than the band of PUSCH of the second FDD uplink band. The sum of the flexible wireless backhaul downlink band and the flexible wireless backhaul uplink band of the third FDD band is smaller than the band of PUSCH of the third FDD uplink band.

The method for wireless backhaul frequency band flexible allocation of the present invention, compared to conventional technologies, provides flexible allocation of FDD uplink resource as the uplink and downlink wireless backhaul of small cells. Wireless backhaul of small cells usually applies wireless communication to connect to the antenna of a big cell station, and the antenna is particularly for connection with the wireless backhaul (among small station and big station). By using the flexible allocation of the wireless backhaul band, when the network service provider has a plurality of FDD bands and would consider building a heterogeneous network of big cell and one or more layer of small cells, the present invention is efficiently configured to use FDD uplink band resource as the wireless backhaul band of the one or more layers of small cells.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following description is about embodiments of the present invention; however it is not intended to limit the scope of the present invention.

The present invention is configured to be applied in a heterogeneous network with big cells and small cells, especially when the service provider of the heterogeneous network provides more than two FDD bands in pair and the big cell and small cell operate in different bands.

Figure 1:
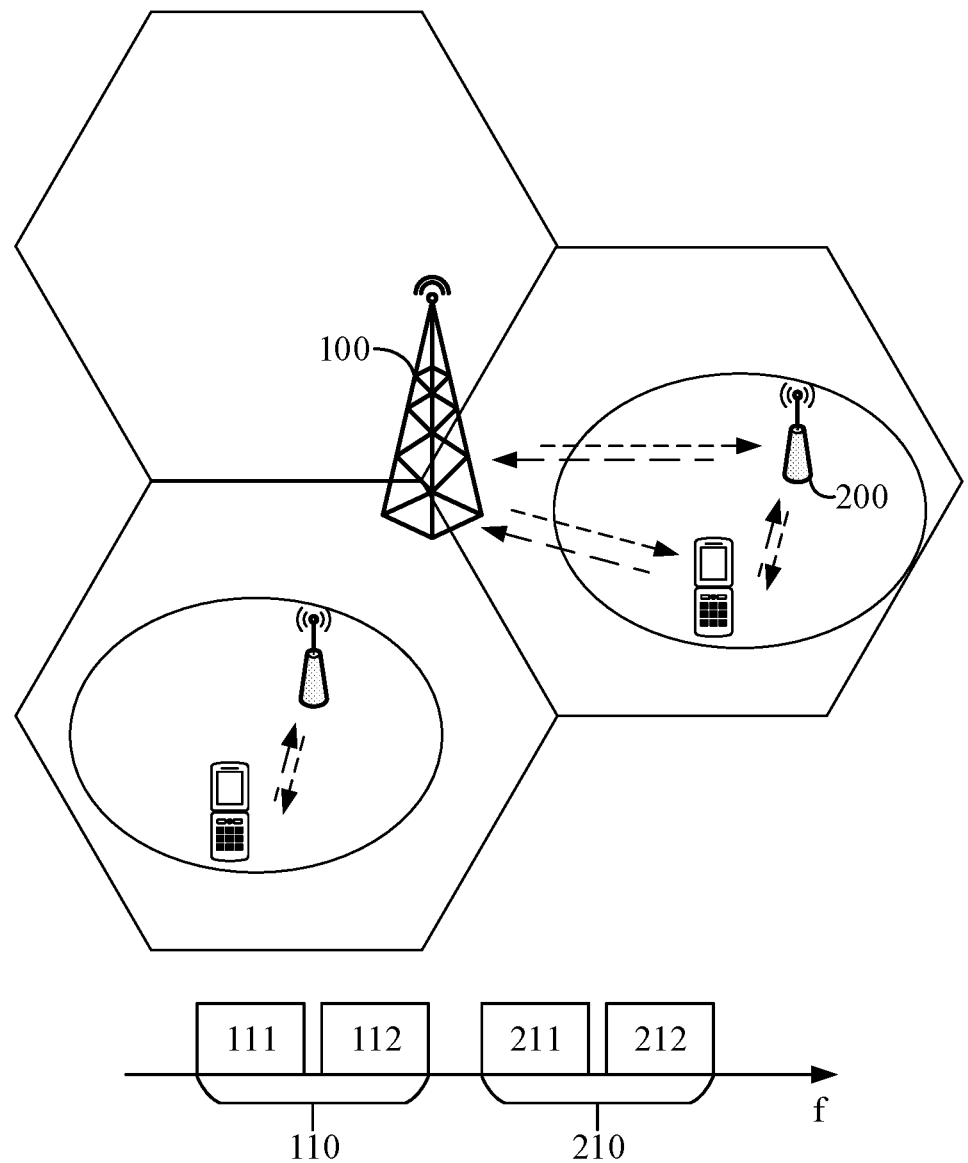
FIG. 1 shows an allocation diagram of the present invention of wireless backhaul frequency band flexible allocation.

FIG. 1 shows an allocation diagram of the present invention of wireless backhaul frequency band flexible allocation. A heterogeneous network comprises a big cell 100 and a small cell 200. The big cell 100 uses a first FDD band 110 comprising a first FDD uplink band 111 and a first FDD downlink band 112. The small cell 200 uses a second FDD band 210 comprising a second FDD uplink band 211 and a second FDD downlink band 212. The mobile device in the heterogeneous network is able to apply dual connectivity to both connect to the big cell 100 and the small cell 200.

Figure 2:
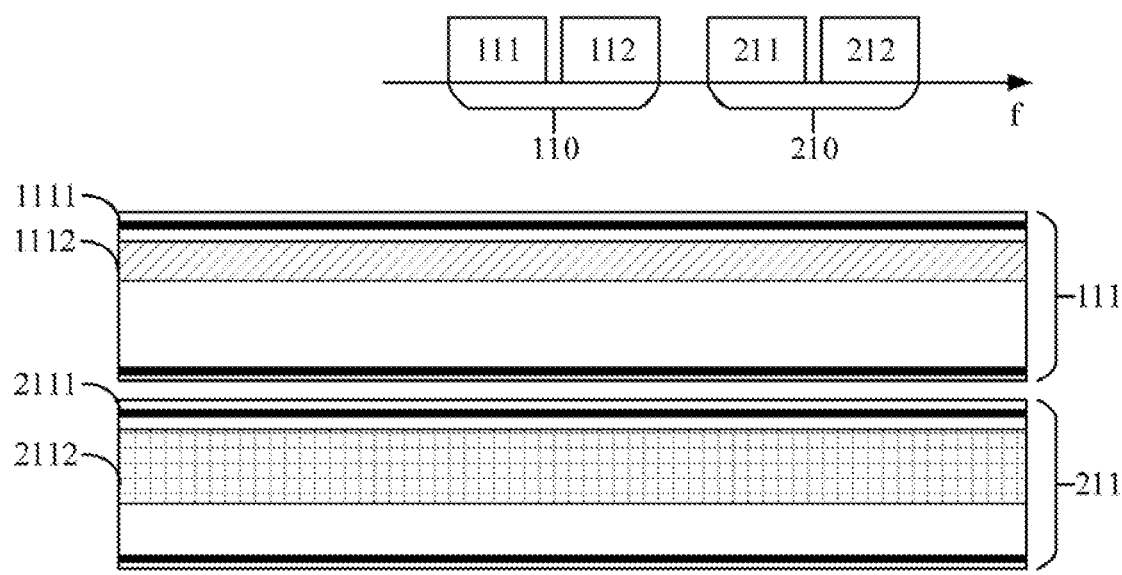
FIG. 2 shows a band allocation diagram of the present invention of wireless backhaul frequency band flexible allocation.

FIG. 2 shows a band allocation diagram of the present invention of wireless backhaul frequency band flexible allocation.

First, the present invention is configured to set a first FDD band 110 in the big cell 100 of a heterogeneous network and set a second FDD band 210 in the small cell 200 of the heterogeneous network.

The first FDD band 110 of the big cell 100 comprises a first FDD uplink band 111 and a first FDD downlink band 112. The second FDD band 210 of the small cell 200 comprises a second FDD uplink band 211 and a second FDD downlink band 212. The uplink band 111 of the first FDD band comprises a first Physical Uplink Control CHannel (PUCCH) 1111 and a flexible wireless backhaul uplink band 1112, and the remaining portion is a Physical Uplink Shared CHannel (PUSCH) of the first FDD band. The wireless backhaul uplink band 1112 is configured to provide time-frequency resource to the uplink wireless backhaul among the big cell and small cell (data flows from the small cell 200 to the big cell 100). The allocation of the wireless backhaul uplink band is to first allocate the PUSCH of the PUCCH near the higher frequency.

The second FDD uplink band 211 comprises a second Physical Uplink Control CHannel (PUCCH) 2111 and a wireless backhaul downlink band 2112, and the remaining portion is a Physical Uplink Shared CHannel (PUSCH) of the second FDD band. The wireless backhaul downlink band 2112 is configured to provide time-frequency resource to the downlink wireless backhaul among the big cell and small cell (data flow from the big cell 100 to the small cell 200). The allocation of the wireless backhaul downlink band is to first allocate the PUSCH of the PUCCH near the higher frequency.

The wireless backhaul uplink band 1112 is smaller than the band of PUSCH of the first FDD uplink band 111. The wireless backhaul downlink band 2112 is smaller than the band of PUSCH of the second FDD uplink band 211. The wireless backhaul downlink band 2112 is larger than the wireless backhaul uplink band 1112.

As shown in FIG. 2, the first FDD uplink band 111 has time-frequency resources like the first PUCCH 1111 at the highest frequency. Also, the first FDD uplink band 111 allocates a wireless backhaul uplink band 1112 at high frequency to the uplink wireless backhaul among the big cell and small cell (data flows from the small cell 200 to the big cell 100). The second FDD uplink band 211 has time-frequency resources like the second PUCCH 2111 at the highest frequency. Also, the second FDD uplink band 211 allocates a wireless backhaul downlink band 2112 at high frequency to the downlink wireless backhaul among the big cell and small cell (data flows from the big cell 100 to the small cell 200). Since the downlink traffic volume of the small cell 200 would be quite more than the uplink traffic volume thereof, the wireless backhaul downlink band 2112 would be larger than the wireless backhaul uplink band 1112. To prevent wireless backhaul when using the FDD uplink band from influencing the uplink transmission of mobile phone, the uplink band assigned to the mobile phone would be arranged upward from the low frequency portion of the uplink band.

Figure 3:
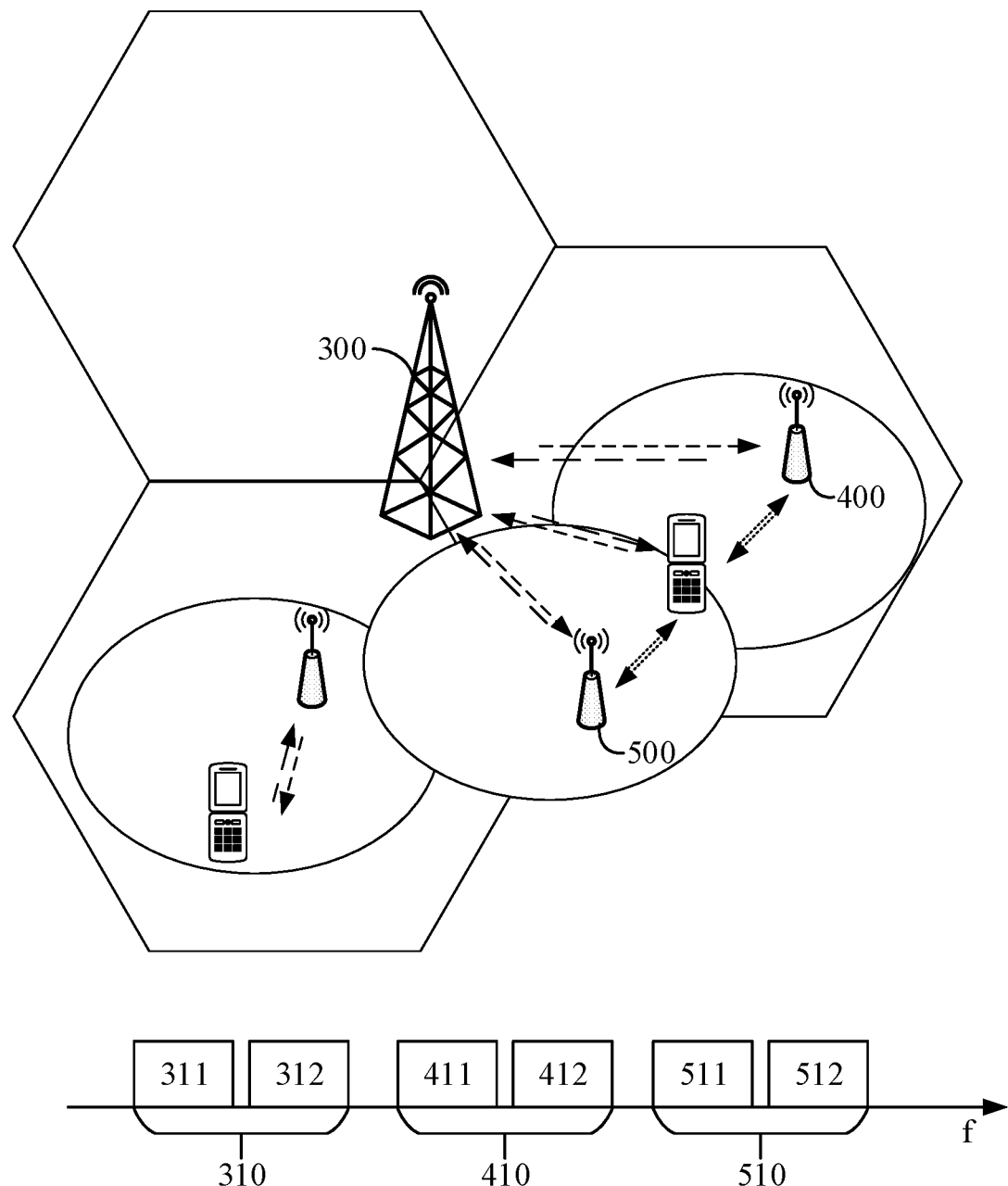
FIG. 3 shows another allocation diagram of the present invention of wireless backhaul frequency band flexible allocation.

FIG. 3 shows another allocation diagram of the present invention of wireless backhaul frequency band flexible allocation. The heterogeneous network has three FDD bands. The first FDD band 310 applied in the big cell 300 comprises a first FDD uplink band 311 and a first FDD downlink band 312. The second FDD band 410 applied in the first layer small cell 400 comprises a second FDD uplink band 411 and a second FDD downlink band 412. The third FDD band 510 applied in the second small cell 500 comprises a third FDD uplink band 511 and a third FDD downlink band 512.

Figure 4:
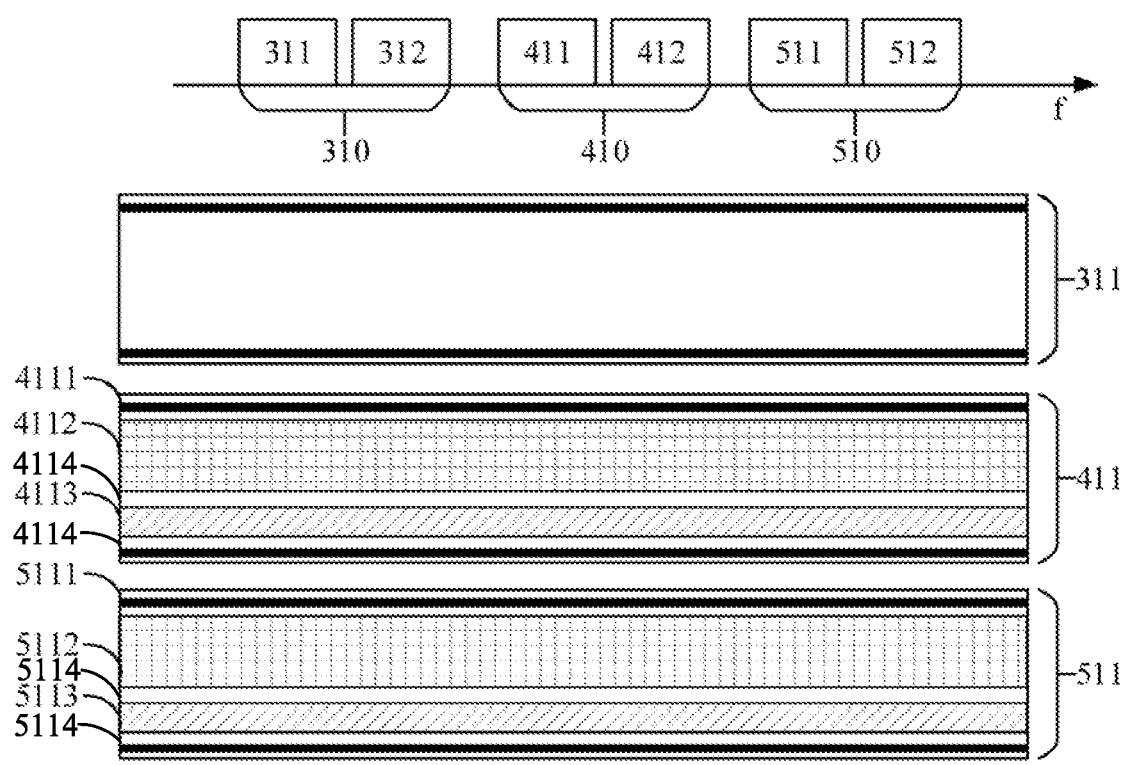
FIG. 4 shows another band allocation diagram of the present invention of wireless backhaul frequency band flexible allocation.

FIG. 4 shows another band allocation diagram of the present invention of wireless backhaul frequency band flexible allocation.

A first FDD band 310 is set in a big cell 300 of a heterogeneous network. A second FDD band 400 is set in a first layer small cell of the heterogeneous network, and a third FDD band 510 is set in a second layer small cell 500 of the heterogeneous network.

The second FDD uplink band 411 of the first layer small cell 400 comprises a second FDD PUCCH 4111, a second wireless backhaul downlink band 4112 and a second wireless backhaul uplink band 4113, and the remaining portion is the second FDD PUSCH 4114. The second wireless backhaul downlink band 4112 is configured to provide time-frequency resource to the downlink wireless backhaul among the big cell 300 and the second layer small cell 500 (data flows from the big cell 300 to the second layer small cell 500). The second wireless backhaul uplink band 4113 is configured to provide time-frequency resource to the uplink wireless backhaul among the big cell 300 and the first layer small cell 400 (data flows from the first layer small cell 400 to the big cell 300). The allocation of the two bands is to first allocate the second FDD PUSCH 4114 of the second FDD PUCCH 4111 near the higher frequency and the particular sequence is first allocating the second wireless backhaul downlink band 4112 and then allocating the second wireless backhaul uplink band 4113, and the remaining portion is as the second FDD PUSCH 4114 of the first layer small cell 400. The third FDD uplink band 511 of the second layer small cell 500 comprises a third FDD PUCCH 5111, a third wireless backhaul downlink band 5112 and a third wireless backhaul uplink band 5113, and the remaining portion is the third FDD PUSCH 5114. The third wireless backhaul downlink band 5112 is configured to provide time-frequency resource to the downlink wireless backhaul among the big cell 300 and the first layer small cell 400 (data flows from the big cell 300 to the first layer small cell 400). The third wireless backhaul uplink band 5113 is configured to provide time-frequency resource to the uplink wireless backhaul among the big cell 300 and the second layer small cell 500 (data flows from the second layer small cell 500 to the big cell 300). The allocation of the two bands is to first allocate the third FDD PUSCH 5114 of the third FDD PUCCH 5111 near the higher frequency and the particular sequence is first allocating the third wireless backhaul downlink band 5112 and then allocating the third wireless backhaul uplink band 5113, and the remaining portion is as the third FDD PUSCH 5114 of the second layer small cell 500.

A sum of the second wireless backhaul downlink band 4112 and the second wireless backhaul uplink band 4113 of the second FDD band is smaller than the band of the second FDD PUSCH 4114 of the second FDD uplink band 411. A sum of the third wireless backhaul downlink band 5112 and the third wireless backhaul uplink band 5113 of the third FDD band is smaller than the band of the third FDD PUSCH 5114 of the third FDD uplink band 511.

The present invention further provides a method for wireless backhaul frequency band flexible allocation and comprises steps of:

setting a first FDD band in a big cell of a heterogeneous network for the big cell, setting a second FDD band for a first layer small cell, and setting a third FDD band for a second layer small cell;

the first FDD band of the big cell comprising a first FDD uplink band and a first FDD downlink band, the second FDD band of the first layer small cell comprising a second FDD uplink band and a second FDD downlink band; the third FDD band of the second layer small cell comprising a third FDD uplink band and a third FDD downlink band;

the second FDD uplink band comprising a second FDD Physical Uplink Control CHannel (PUCCH) and a second FDD Physical Uplink Shared CHannel (PUSCH) located in two sides of the second FDD uplink band, flexibly allocating a second wireless backhaul downlink band and a second wireless backhaul uplink band in the second FDD PUSCH of the second FDD band, the allocated second wireless backhaul downlink band as a downlink wireless backhaul among the big cell and the second layer small cell (data flow from the big cell to the second layer small cell), the allocated second wireless backhaul uplink band as an uplink wireless backhaul among the big cell and the first layer small cell (data flow from the first layer small cell to the big cell), wherein the allocation of the second wireless backhaul downlink band and the second wireless backhaul uplink band is first to allocate a portion of the second FDD PUSCH that is near to the second FDD PUCCH which is near a higher frequency of the second FDD uplink band, and an allocation sequence is allocating the second wireless backhaul downlink band, and then allocating the second wireless backhaul uplink band, and remainder of the second FDD band is the second FDD PUSCH; and the third FDD uplink band comprising a third FDD Physical Uplink Control CHannel (PUCCH) and a third FDD Physical Uplink Shared CHannel (PUSCH) located in two sides of the third FDD uplink band, flexibly allocating a third wireless backhaul downlink band and a third wireless backhaul uplink band in the third FDD PUSCH of the third FDD band, the allocated third wireless backhaul downlink band as a downlink wireless backhaul among the big cell and the first layer small cell (data flow from the big cell to the first layer small cell), the allocated third wireless backhaul uplink band as an uplink wireless backhaul among the big cell and the second layer small cell (data flow from the second layer small cell to the big cell), wherein the allocation of the third wireless backhaul downlink band and the third wireless backhaul uplink band is first to allocate a portion of the third FDD PUSCH that is near to the third FDD PUCCH which is near a higher frequency of the third FDD uplink band, and an allocation sequence is allocating the third wireless backhaul downlink band, and then allocating the third wireless backhaul uplink band, and remainder of the third FDD band is the third FDD PUSCH. Moreover, sum of the second wireless backhaul downlink band and the second wireless backhaul uplink band of the second FDD band is smaller than the band of the second FDD PUSCH of the second FDD uplink band. Further, sum of the third wireless backhaul downlink band and the third wireless backhaul uplink band of the third FDD band is smaller than the band of the third FDD PUSCH of the third FDD uplink band.

The method for wireless backhaul frequency band flexible allocation of the present invention is efficient for a heterogeneous network and provides good isolation between the uplink and downlink wireless backhauls. Moreover, the allocation design of wireless backhaul of the present invention starts from the high frequency portion of a band. This kind of design makes the mobile phone use low frequency of the band and ensures better uplink covering rate regarding the opposite band allocation method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for wireless backhaul frequency band flexible allocation, comprising steps of:
   S21: setting a first FDD band in a big cell of a heterogeneous network for the big cell, setting a second FDD band for a first layer small cell, and setting a third FDD band for a second layer small cell;
   S22: the first FDD band of the big cell comprising a first FDD uplink band and a first FDD downlink band, the second FDD band of the first layer small cell comprising a second FDD uplink band and a second FDD downlink band; the third FDD band of the second layer small cell comprising a third FDD uplink band and a third FDD downlink band;
   S23: the second FDD uplink band comprising a second FDD Physical Uplink Control CHannel (PUCCH) and a second FDD Physical Uplink Shared CHannel (PUSCH) located in two sides of the second FDD uplink band, flexibly allocating a second wireless backhaul downlink band and a second wireless backhaul uplink band in the second FDD PUSCH of the second FDD band, the allocated second wireless backhaul downlink band as a downlink wireless backhaul among the big cell and the second layer small cell (data flow from the big cell to the second layer small cell), the allocated second wireless backhaul uplink band as an uplink wireless backhaul among the big cell and the first layer small cell (data flow from the first layer small cell to the big cell), wherein the allocation of the second wireless backhaul downlink band and the second wireless backhaul uplink band is first to allocate a portion of the second FDD PUSCH that is near to the second FDD PUCCH which is near a higher frequency of the second FDD uplink band, and an allocation sequence is allocating the second wireless backhaul downlink band, and then allocating the second wireless backhaul uplink band, and remainder of the second FDD band is the second FDD PUSCH; and
   S24: the third FDD uplink band comprising a third FDD Physical Uplink Control CHannel (PUCCH) and a third FDD Physical Uplink Shared CHannel (PUSCH) located in two sides of the third FDD uplink band, flexibly allocating a third wireless backhaul downlink band and a third wireless backhaul uplink band in the third FDD PUSCH of the third FDD band, the allocated third wireless backhaul downlink band as a downlink wireless backhaul among the big cell and the first layer small cell (data flow from the big cell to the first layer small cell), the allocated third wireless backhaul uplink band as an uplink wireless backhaul among the big cell and the second layer small cell (data flow from the second layer small cell to the big cell), wherein the allocation of the third wireless backhaul downlink band and the third wireless backhaul uplink band is first to allocate a portion of the third FDD PUSCH that is near to the third FDD PUCCH which is near a higher frequency of the third FDD uplink band, and an allocation sequence is allocating the third wireless backhaul downlink band and then allocating the third wireless backhaul uplink band, and remainder of the third FDD band is the third FDD PUSCH.

2. The method for wireless backhaul frequency band flexible allocation as claimed in claim 1, wherein sum of the second wireless backhaul downlink band and the second wireless backhaul uplink band of the second FDD band is smaller than the band of the second FDD PUSCH of the second FDD uplink band.

3. The method for wireless backhaul frequency band flexible allocation as claimed in claim 1, wherein sum of the third wireless backhaul downlink band and the third wireless backhaul uplink band of the third FDD band is smaller than the band of the third FDD PUSCH of the third FDD uplink band.

* * * * *